(12) United States Patent
Kitagawa et al.

(10) Patent No.: US 8,278,395 B2
(45) Date of Patent: Oct. 2, 2012

(54) PROCESS FOR MANUFACTURING MODIFIED CONJUGATED DIENE POLYMER, COMPOSITION COMPRISING THE POLYMER, AND TIRE COMPRISING THE COMPOSITION

(75) Inventors: Yuichi Kitagawa, Tokyo (JP); Toshikazu Hoshina, Tokyo (JP); Kiyoo Katou, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 355 days.

(21) Appl. No.: 12/593,164

(22) PCT Filed: Mar. 25, 2008

(86) PCT No.: PCT/JP2008/055492
§ 371 (c)(1),
(2), (4) Date: Sep. 25, 2009

(87) PCT Pub. No.: WO2008/123215
PCT Pub. Date: Oct. 16, 2008

(65) Prior Publication Data
US 2010/0210760 A1    Aug. 19, 2010

(30) Foreign Application Priority Data
Mar. 28, 2007   (JP) .................................. 2007-084310

(51) Int. Cl.
*C08F 8/32* (2006.01)
*C08F 4/48* (2006.01)
*C08F 236/10* (2006.01)

(52) U.S. Cl. .................. 525/332.9; 525/331.9; 525/381; 525/382; 525/385; 525/333.6; 524/572; 524/575; 523/400; 523/468; 152/564; 526/335; 526/340

(58) Field of Classification Search ............... 525/331.9, 525/332.9, 381, 382, 385, 333.6; 524/572, 524/575, 115, 122; 523/400, 468
See application file for complete search history.

(56) References Cited

U.S. PATENT DOCUMENTS

| | | | |
|---|---|---|---|
| 4,501,857 A | 2/1985 | Kishimoto et al. | |
| 4,673,714 A | 6/1987 | Kishimoto et al. | |
| 4,914,248 A * | 4/1990 | Kitagawa et al. | ......... 525/113 |
| 5,527,753 A | 6/1996 | Engel et al. | |
| 5,708,092 A | 1/1998 | Schwindeman et al. | |
| 6,906,152 B2 | 6/2005 | Saito et al. | |
| 2003/0114612 A1 | 6/2003 | Grun et al. | |
| 2003/0119966 A1 | 6/2003 | Fusamae et al. | |
| 2003/0199669 A1* | 10/2003 | Saito et al. | ......... 528/393 |
| 2009/0111933 A1* | 4/2009 | Yamada et al. | ......... 524/502 |

FOREIGN PATENT DOCUMENTS

| | | |
|---|---|---|
| CN | 1894288 A | 1/2007 |
| EP | 1 153 972 A1 | 11/2001 |
| EP | 1 865 023 A1 | 12/2007 |
| GB | 2 241 239 A | 8/1991 |
| JP | 42-8704 B | 4/1967 |
| JP | 43-6636 B | 3/1968 |
| JP | 59-140211 A | 8/1984 |
| JP | 63-4841 B | 2/1988 |
| JP | 1-37970 B | 8/1989 |
| JP | 1-53851 B | 11/1989 |
| JP | 2-9041 B | 2/1990 |
| JP | 07-330959 A | 12/1995 |
| JP | 08-109219 A | 4/1996 |
| JP | 2538629 B | 7/1996 |
| JP | 2001-131227 A | 5/2001 |
| JP | 2003-119223 A | 4/2003 |
| JP | 2003-155398 A | 5/2003 |
| WO | WO 87/05610 | 9/1987 |
| WO | WO 01/23467 A1 | 4/2001 |
| WO | WO 01/23467 A1 | 5/2001 |
| WO | WO 02/064636 A1 | 8/2002 |
| WO | 2005/056615 A1 | 6/2005 |
| WO | 2006/104215 A1 | 10/2006 |
| WO | WO 2006/104215 A1 * | 10/2006 |

OTHER PUBLICATIONS

V. Null, Safe Process Oils for Tires with Low Environmental Impact, Kautschuk Gummi Kunststoffe, 52, 12/799, p. 799-805, 1999.
Yasuyuki Tanaka et al., Determination of sequence length distribution in SBR by ozonolysis-g.p.c. method, Polymer, vol. 22, p. 1721-1723, Dec. 1981.
Chinese Office Action dated Dec. 31, 2010 which issued in Chinese Patent Application No. 200800098159.

* cited by examiner

*Primary Examiner* — Roberto Rabago
(74) *Attorney, Agent, or Firm* — Morgan, Lewis & Bockius LLP

(57) ABSTRACT

The present invention has an object to provide a conjugated diene-based polymer, subjected to a vulcanization treatment to make a vulcanized rubber, the vulcanized rubber useful as a material for tire treads excellent in the balance among wet skid characteristics, low hysteresis loss, abrasion resistance, breaking strength and rigidity, and to provide its manufacturing process. According to the present invention, there is provided the process for manufacturing a modified conjugated diene-based polymer having a modifying group in its molecule, the process including a step of obtaining a conjugated diene-based polymer by polymerizing a conjugated diene compound, or a conjugated diene compound and an aromatic vinyl compound, by using an alkaline metal-based initiator or an alkaline earth metal-based initiator in a hydrocarbon solvent, and a step of reacting active terminals of the polymer with a glycidylamino group-containing low molecular compound having two or more tertiary amino groups and three or more glycidyl groups bonded to the amino groups in a molecule of the compound, and an oligomer of a dimmer or more of the low molecular compound as modifying agents, wherein the reaction is performed using 75 to 95% by mass of the low molecular compound and 25 to 5% by mass of the oligomer based on the total amount of the modifying agents.

11 Claims, 5 Drawing Sheets

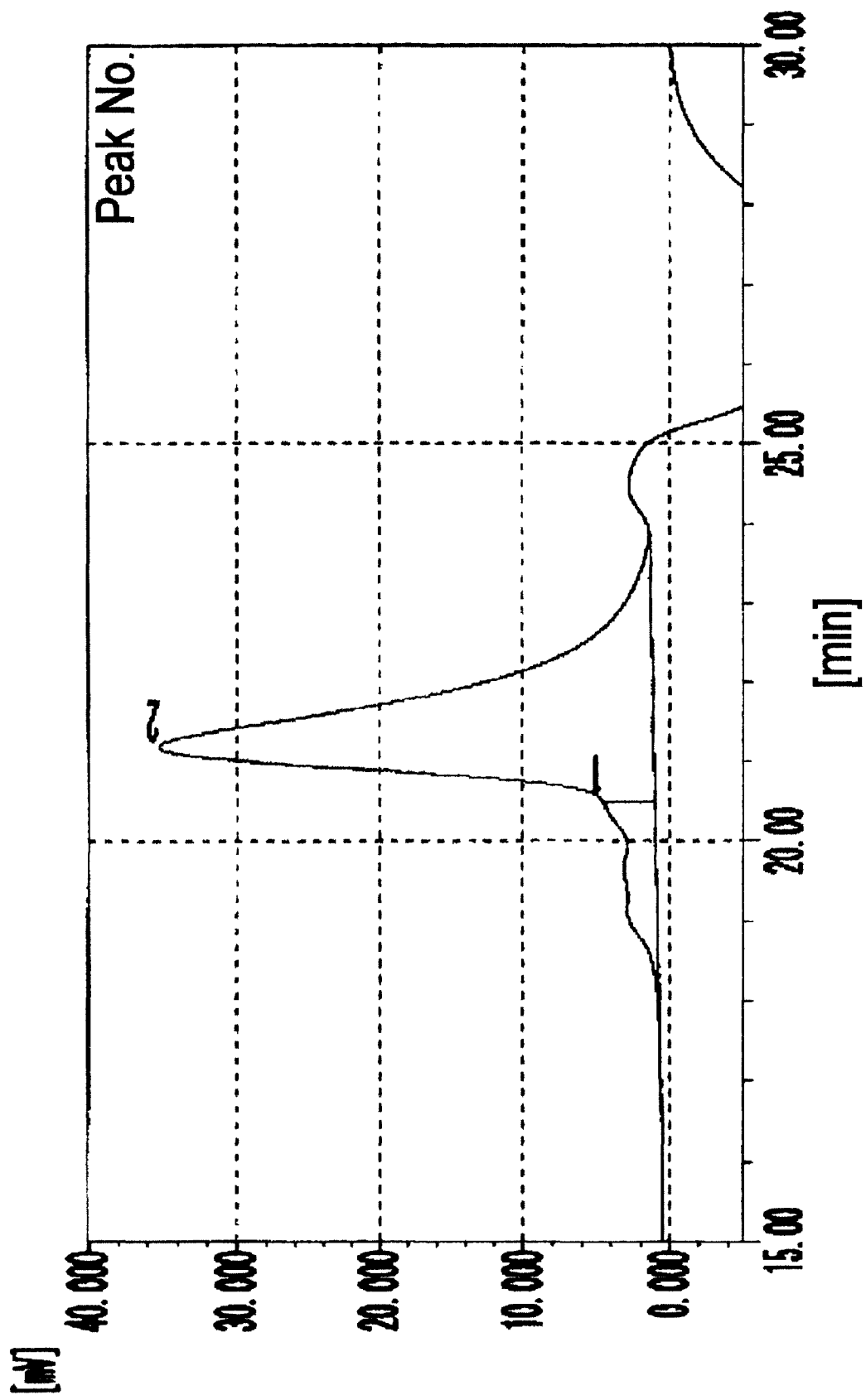

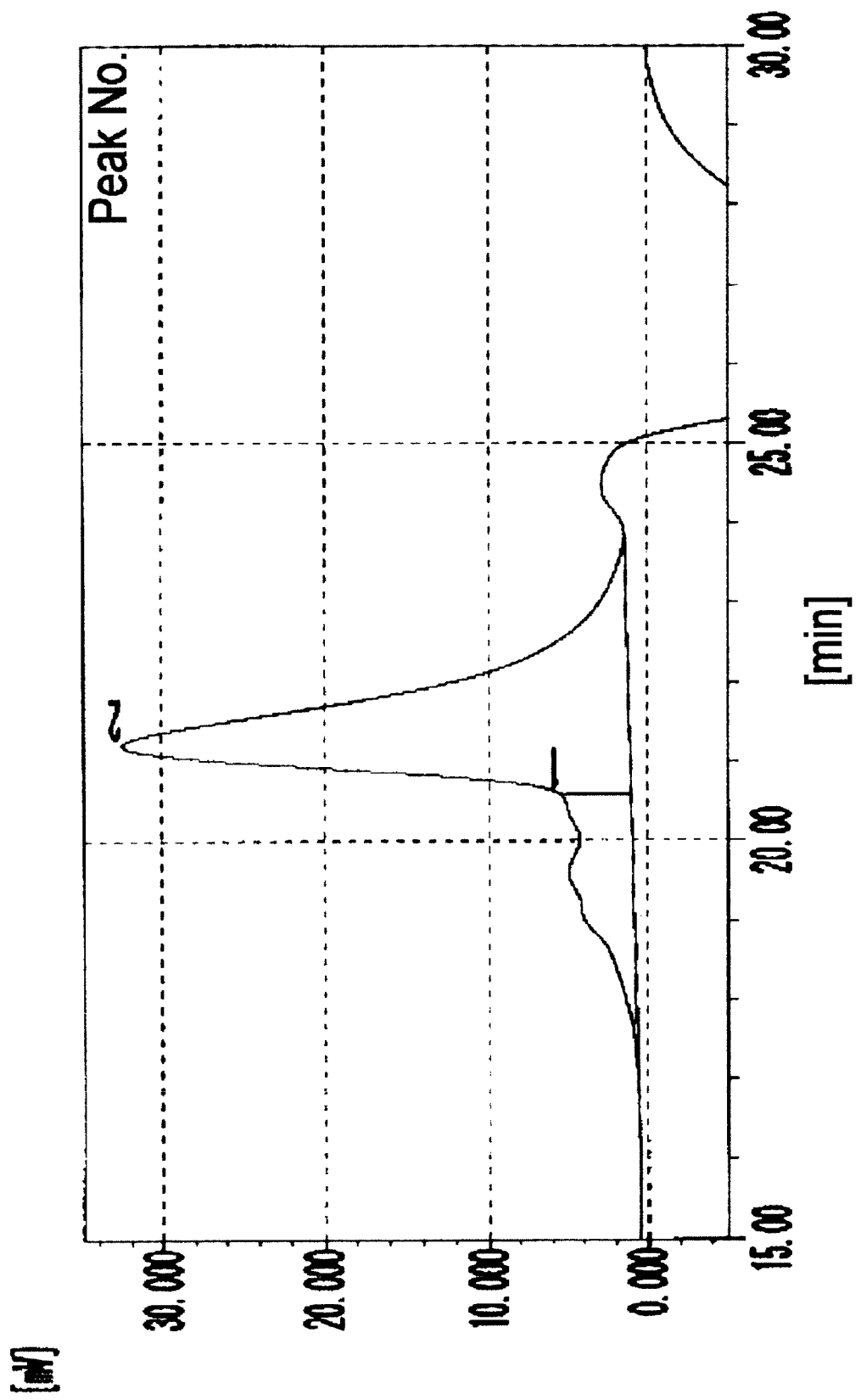
Figure-2 GPC curve of modifying agent B

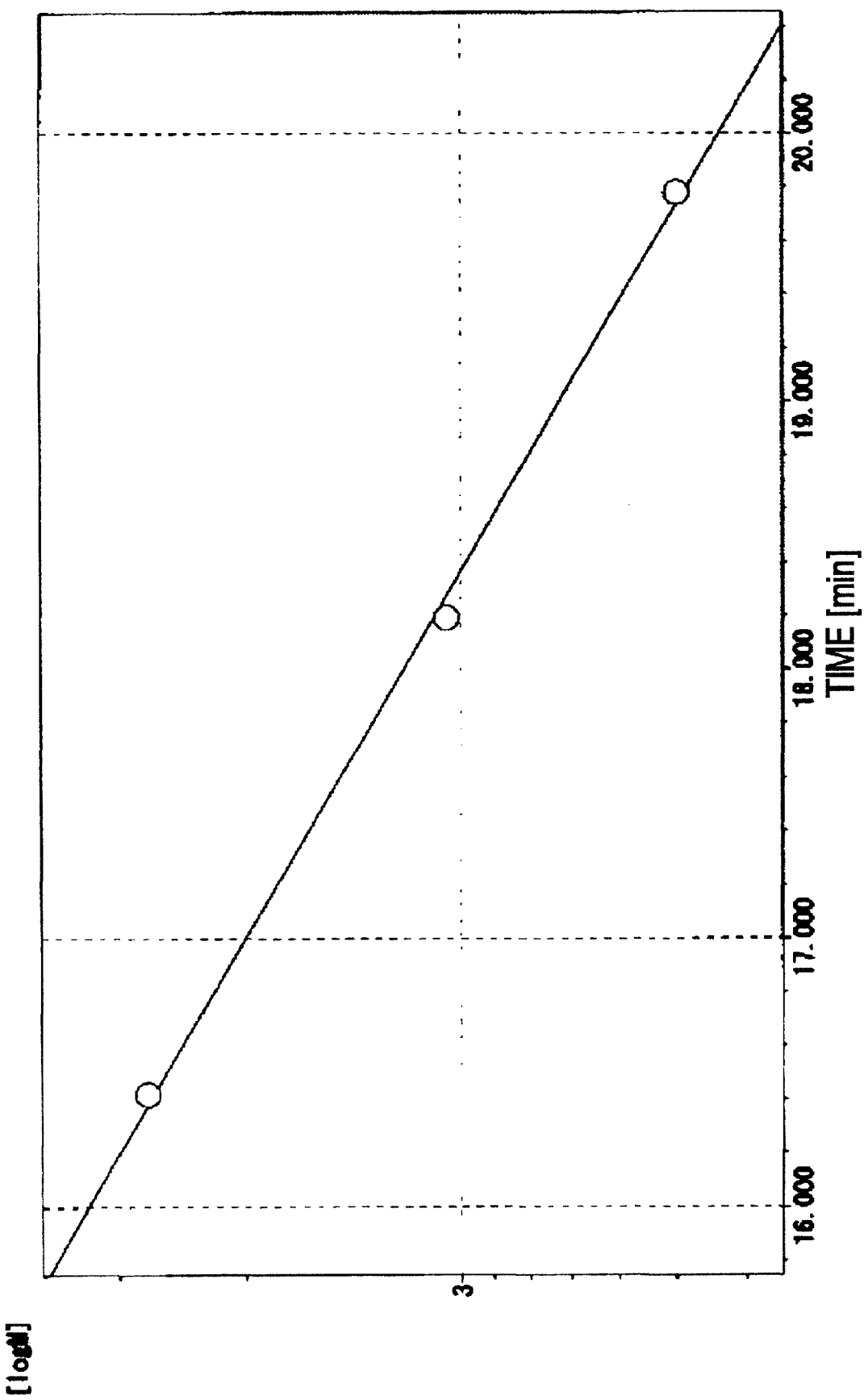

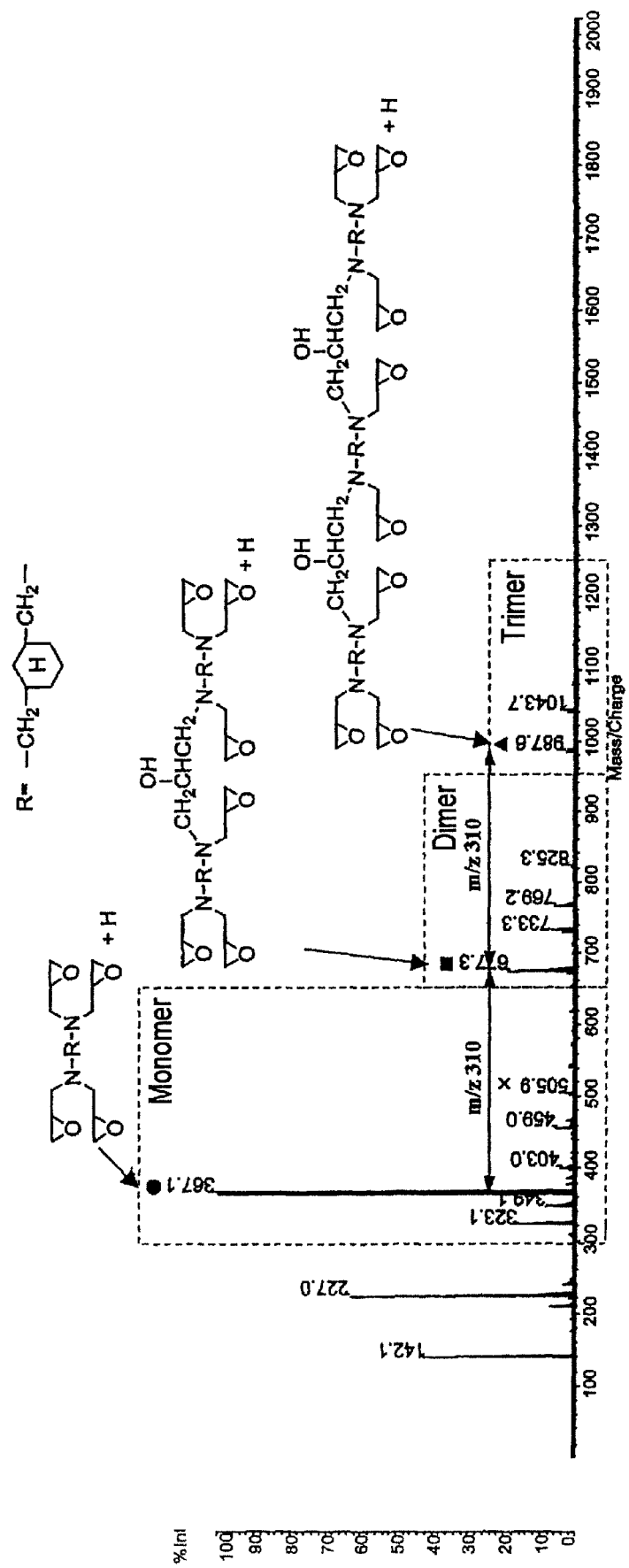
Figure-4 Mass spectrum of modifying agent A

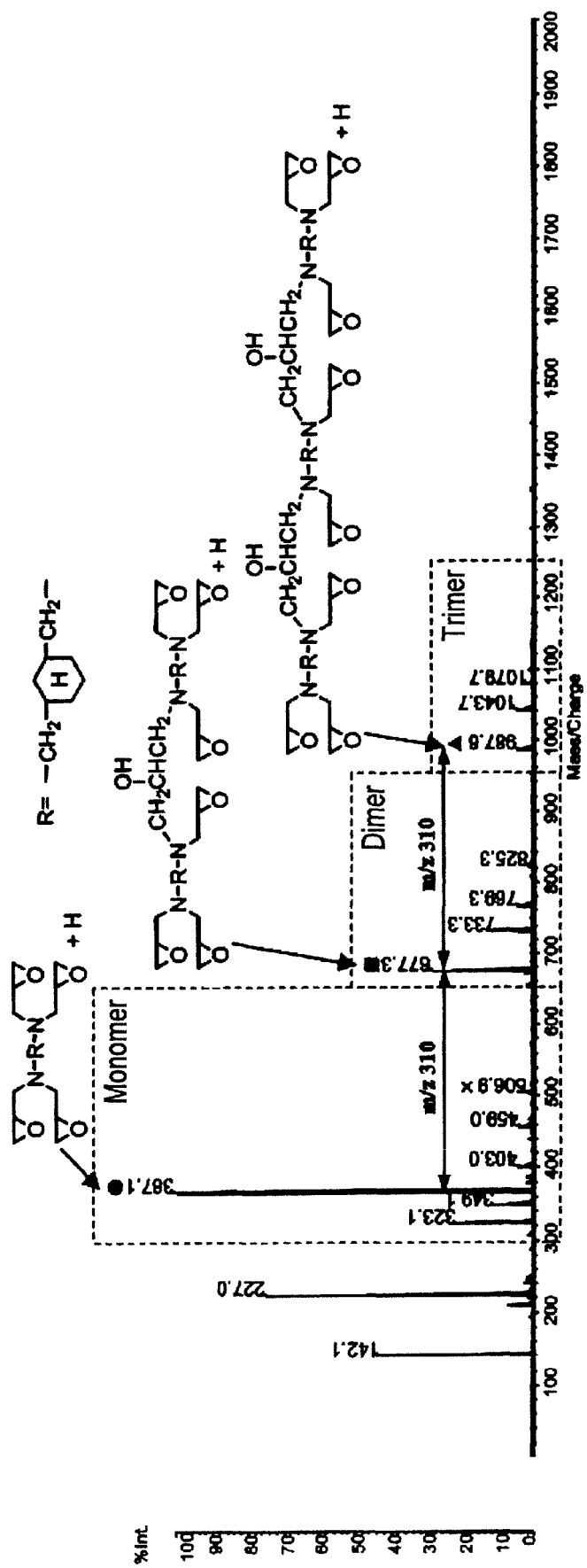
Figure-5 Mass spectrum of modifying agent B

PROCESS FOR MANUFACTURING MODIFIED CONJUGATED DIENE POLYMER, COMPOSITION COMPRISING THE POLYMER, AND TIRE COMPRISING THE COMPOSITION

TECHNICAL FIELD

The present invention relates to a process for manufacturing a modified conjugated diene-based polymer. Particularly, the present invention relates to a process for manufacturing a conjugated diene-based polymer having in its molecule a modifying group using a specified polyfunctional compound, a composition comprising a polymer obtainable by the manufacturing process, and a tire comprising the composition.

BACKGROUND ART

Along with the recent years' requirement for better fuel-efficiency of automobiles, a conjugated diene-based polymer is demanded which can provide a vulcanized rubber, as a rubber material for tires, having a low rolling resistance, excelling in abrasion resistance and fracture characteristics, excelling in wet skid resistance, and having an excellent rigidity.

In order to reduce the rolling resistance of tires, the hysteresis loss of vulcanized rubber need to be made low. As an evaluation index of the hysteresis loss, rubber materials are preferable which have a high impact resilience at 50 to 80° C., or a low tan δ or Goodrich heat generation at 50 to 80° C. As rubber materials having a low hysteresis loss, natural rubbers, polyisoprene rubbers, polybutadiene rubbers and the like are known, but these have a problem of having a low wet skid resistance.

As methods for reducing the hysteresis loss without impairing the wet skid resistance, there are proposed a method of increasing the 1,2-vinyl structure being a microstructure of butadiene in styrene-butadiene (co)polymers having various structures polymerized by an organolithium initiator in a hydrocarbon solvent, a method of introducing a modifying group to polymer terminals, and other methods.

On the other hand, in order to improve the steering stability of high-performance tires, vulcanized rubbers are desired to have a high rigidity, and as evaluation indexes, they preferably exhibit a small change in storage elastic modulus against strain at 50° C., and a high storage elastic modulus at a high strain. As methods of enhancing the rigidity of vulcanized rubbers, there are no effective methods other than the improvement of filler compositions, and making the molecular weight high as an improvement of raw material rubbers.

Under such a situation, for example, Patent Documents 1 to 4 disclose modified polymers obtained by reacting active terminals of a rubbery polymer with a polyfunctional low molecular weight compound having an epoxy group and a tertiary amino group in its molecule.
Patent Document 1: Japanese Patent No. 2538629
Patent Document 2: International Publication Pamphlet 01/23467
Patent Document 3: Japanese Patent Laid-Open No. 2001-131227
Patent Document 4: Japanese Patent Laid-Open No. 2003-119223

DISCLOSURE OF THE INVENTION

Problems to be Solved by the Invention

However, in conventional arts described above, although vulcanized rubber compositions using these polymers are improved in a balance between the hysteresis loss and the wet skid resistance, the rigidity and the abrasion resistance are not sufficient, so improvements are desired.

In consideration of such a situation, the present invention provides a process for manufacturing a polymer providing a vulcanized rubber which excels in the balance among wet skid characteristics, low hysteresis loss, abrasion resistance and breaking strength, and further excels in rigidity when the polymer is blended with reinforcing fillers and vulcanized to make the vulcanized rubber.

Means for Solving the Problems

As a result of exhaustive studies to solve the problems described above, the present inventors have found a manufacturing process of a conjugated diene-based polymer which can provide a high-performance vulcanized rubber composition by reacting active terminals of a polymer with a specified polyfunctional compound as a modifying agent. This finding has led to the completion of the present invention.

When a modified conjugated diene-based polymer having a modifying group in its molecule is manufactured, although methods have commonly been performed in which active terminals of a polymer are reacted with a low molecular compound having a glycidylamino group as a modifying agent, a method of reacting with an oligomer of a dimer or more of the low molecular compound has been considered not to be preferable because of a decrease in the modification ratio due to decreases in the hydroxide group and the epoxy equivalent weight the oligomer has. It has been found that the present invention provides a manufacturing process of a modified conjugated diene-based polymer which can provide a vulcanized rubber excelling in the balance among wet skid characteristics, low hysteresis loss, abrasion resistance and breaking strength, and further excelling in rigidity, which is an object of the present invention, by reacting specified active terminals of a polymer with a glycidylamino group-containing low molecular compound and its oligomer as modifying agents in a specified proportion. This finding has led to the completion of the present invention.

The present invention provides the following aspects:

[1] A process for manufacturing a modified conjugated diene-based polymer having a modifying group in a molecule thereof, the process comprising:
a step of obtaining a conjugated diene-based polymer by polymerizing a conjugated diene compound, or a conjugated diene compound and an aromatic vinyl compound, by using an alkaline metal-based initiator or an alkaline earth metal-based initiator in a hydrocarbon solvent; and a step of reacting active terminals of the polymer with a glycidylamino group-containing low molecular compound having two or more tertiary amino groups and three or more glycidyl groups bonded to the amino groups in a molecule of the compound, and an oligomer of a dimer or more of the low molecular compound as modifying agents, wherein the reaction is performed using 75 to 95% by mass of the low molecular compound and 25 to 5% by mass of the oligomer based on the total amount of the modifying agents;

[2] The process for manufacturing the modified conjugated diene-based polymer according to [1], wherein the low molecular compound used in the reaction is a low molecular compound having two diglycidylamino groups in a molecule thereof;

[3] The process for manufacturing the modified conjugated diene-based polymer according to [1] or [2], wherein the conjugated diene-based polymer is a random copolymer of at least one conjugated diene compound and at least one aromatic vinyl compound;

[4] A modified conjugated diene-based polymer obtainable by the manufacturing process of any one of [1] to [3];

[5] An oil-extended modified conjugated diene-based polymer composition, comprising 100 parts by mass of the modified conjugated diene-based polymer according to [4] and 5 to 60 parts by mass of an extension oil containing 3% by mass or less of polycyclic aromatic components by the IP 346 method;

[6] A modified conjugated diene-based polymer composition, comprising 100 parts by mass of the modified conjugated diene-based polymer according to [4] and 1 to 200 parts by mass of silica-based inorganic filler;

[7] A modified conjugated diene-based polymer composition, comprising 100 parts by mass of the modified conjugated diene-based polymer according to [4] and 1 to 100 parts by mass of a carbon black; and

[8] A tire comprising the composition according to [6] or [7].

Advantages of the Invention

According to the present invention, when the modified conjugated diene-based polymer is blended with reinforcing fillers, and subjected to a vulcanization treatment to make a vulcanized rubber, the vulcanized rubber is provided which excels in the balance among wet skid characteristics, low hysteresis loss, abrasion resistance and breaking strength, and further excels in rigidity; and the vulcanized rubber is made into rubber compositions suitable for rubbers for tires, vibration damping rubbers, footwear, and the like. Particularly in the case where the reinforcing filler is precipitated silica, or precipitated silica and carbon black, the advantage is remarkable.

BRIEF DESCRIPTION OF THE DRAWINGS

FIG. 1 shows GPC of a modifying agent A used in the embodiment;

FIG. 2 shows GPC of a modifying agent B used in the embodiment;

FIG. 3 shows a calibration curve by the standard polystyrene for GPC used in the embodiment;

FIG. 4 shows a mass spectrum of the modifying agent A used in the embodiment; and FIG. 5 shows a mass spectrum of the modifying agent B used in the embodiment.

BEST MODE FOR CARRYING OUT THE INVENTION

Hereinafter, the best mode (referred to as "the embodiment") for practicing the present invention will be described in detail. The scope of the present invention is not limited to the following embodiment, and various changes and modifications may be made in the gist of the invention.

The embodiment is a process for manufacturing a modified conjugated diene-based polymer having a modifying group in its molecule, and the process for manufacturing the modified conjugated diene-based polymer comprising the steps of: polymerizing a conjugated diene compound, or a conjugated diene compound and an aromatic vinyl compound by using an alkaline metal-based initiator or an alkaline earth metal-based initiator in a hydrocarbon solvent; and thereafter, reacting active terminals of the obtained polymer with 75 to 95% by mass of a glycidylamino group-containing low molecular compound having two or more tertiary amino groups and three or more glycidyl groups bonded to the amino groups in a molecule of the compound, and 25 to 5% by mass of an oligomer of a dimer or more of the low molecular compound as modifying agents. Here, the contents of the low molecular compound and the oligomer composed of the low molecular compound are indicated in % by mass based on the total amount of the modifying agents. Here, the term "modifying group" used in the embodiment is a group to react with other chemical substances. Especially in the embodiment, specific modifying groups refer to an amino group, an epoxy group, a hydroxyl group, a carbonyl group and the like.

Alkaline metal-based initiators or alkaline earth metal-based initiators usable in the embodiment are any of those having a capability of polymerization initiation. Above all, preferably used is at least one compound selected from the group consisting of organic alkaline metal compounds and organic alkaline earth metal compounds. As the organic alkaline metal compounds, particularly organolithium compounds are suitable. The organolithium compounds include low molecular weight ones, organolithium compounds being solubilized oligomers, those having a single lithium in one molecule thereof, those having a plurality of lithiums in one molecule thereof, and, in the bonding mode of an organic group and lithium, those containing the carbon-lithium bond, those containing nitrogen-lithium bond and the tin-lithium bond. Specifically, mono-organolithium compounds are not limited to the following, but include n-butyllithium, sec-butyllithium, tert-butyllithium, n-hexyllithium, benzyllithium, phenyllithium and stilbene lithium. Polyfunctional organolithium compounds are not limited to the following, but include 1,4-dilithiobutane, a reaction product of sec-butyllithium and diisopropenylbenzene, 1,3,5-trilithiobenzene, a reaction product of n-butyllithium, 1,3-butadiene and divinylbenzene, and a reaction product of n-butyllithium and a polyacetylene compound. The compounds containing the nitrogen-lithium bond are not limited to the following, but include dimethylaminolithium, dihexylaminolithium, diisopropylaminolithium and hexamethyleneiminolithium. Further usable are organic alkaline metal compounds disclosed in U.S. Pat. No. 5,708,092, GB Patent No. 2,241,239, U.S. Pat. No. 5,527,753 and the like.

As organolithium compounds used in the embodiment, especially preferable are n-butyllithium and sec-butyllithium. These organolithium compounds may be used singly or as a mixture of two or more.

Other organic alkaline metal compounds are not limited to the following, but include organic sodium compounds, organic potassium compounds, organic rubidium compounds and organic cesium compounds. Specifically, these are not limited to the following, but include sodium naphthalene and potassium naphthalene, and additionally, alkoxides, sulfonates, carbonates and amides of lithium, sodium and potassium can be used. These are used concurrently with other organometallic compounds in some cases.

On the other hand, the alkaline earth metal compounds are not limited to the following, but typically include organic magnesium compounds, organic calcium compounds and organic strontium compounds. Specifically, these are not limited to the following, but include dibutylmagnesium, ethylbutylmagnesium and propylbutylmagnesium. Compounds of alkoxide, sulfonate, carbonate and amide of alkaline earth metals are also used. These organic alkaline earth metal compounds are used concurrently with organic alkaline metal-based initiators and other organometal compounds in some cases.

The conjugated diene-based polymer obtainable by the manufacturing process according to the embodiment is polymerized by using the above-mentioned alkaline metal-based initiator and/or the alkaline earth metal-based initiator, and is a polymer obtainable by propagation by an anionic polymerization reaction, wherein the polymerization is performed in a polymerization mode of a batchwise type, or a continuous type of one reactor or two or more linked reactors type.

The conjugated diene-based polymer obtainable by the manufacturing process according to the embodiment is preferably a polymer having active terminals obtainable especially by a propagation reaction by the living anionic polymerization.

The conjugated diene-based polymers obtainable by the manufacturing process according to the embodiment include a polymer of a conjugated diene compound, a copolymer of a conjugated diene compound, and a copolymer of a conjugated diene compound-an aromatic vinyl compound. In the polymerization reaction of the embodiment, in order to copolymerize randomly an aromatic vinyl compound and a conjugated diene compound, a small amount of a polar compound as a vinylating agent may be added. The polar compounds are not limited to the following, but used are ethers such as tetrahydrofuran, diethylether, dioxane, ethylene glycol dimethyl ether, ethylene glycol dibutyl ether, diethylene glycol dimethyl ether, diethylene glycol dibutyl ether, dimethoxybenzene and 2,2-bis(2-oxolanyl)propane; tertiary amine compounds such as tetramethylethylenediamine, dipiperidinoethane, trimethylamine, triethylamine, pyridine and quinuclidine; alkaline metal alkoxide compounds such as potassium-t-amylate, potassium-t-butylate, sodium-t-butylate and sodium-t-amylate; phosphine compounds such as triphenylphosphine; alkyl or aryl sulfonate compounds; and the like. These polar compounds may be used singly or in combination of two or more.

The use amount of a polar compound is selected according to an object and a degree of its effect. The amount is commonly 0.01 to 100 mol based on 1 mol of an initiator. Such a polar compound (vinylating agent) as a microstructure regulator of polymer diene parts can be used in a suitable amount depending on a desired vinyl bond amount. Many polar compounds simultaneously have an effective randomizing effect in the copolymerization of a conjugated diene compound and an aromatic vinyl compound, and can be used for regulation of the distribution of an aromatic vinyl compound and as a regulator of the styrene block amount.

The randomizing method may involve a method in which a part of 1,3-butadiene is intermittently added in the course of the copolymerization as described in Japanese Patent Laid-Open No. S59-140211.

Specific examples of conjugated diene compounds used in the embodiment are not limited to the following, but include 1,3-butadiene, isoprene, 2,3-dimethyl-1,3-butadiene, 1,3-pentadiene, 3-methyl-1,3-pentadiene, 1,3-heptadiene and 1,3-hexadiene. These are used singly or in combination of two or more. Preferable conjugated diene compounds used in the embodiment include 1,3-butadiene and isoprene.

Examples of aromatic vinyl compounds used in the embodiment are not limited to the following, but include styrene, p-methylstyrene, α-methylstyrene, vinylethylbenzene, vinylxylene, vinylnaphthalene and diphenylethylene. These are used singly or in combination of two or more. A preferable aromatic vinyl compound used in the embodiment includes styrene. In view of controlling branches in order to prevent cold flow of conjugated diene compounds, polyfunctional aromatic vinyl compounds such as divinylbenzene may be used. The molecular weight (the weight-average molecular weight by gel permeation chromatography (GPC), in terms of polystyrene) of a conjugated diene compound manufactured by the manufacturing process according to the embodiment is preferably 100,000 to 2,000,000 in consideration of processability and physical properties.

Hydrocarbon solvents used in the manufacturing process according to the embodiment are not limited to the following, but include saturated hydrocarbons and aromatic hydrocarbons, and are aliphatic hydrocarbons such as butane, pentane, hexane, pentane and heptane; alicyclic hydrocarbons such as cyclopentane, cyclohexane, methylcyclopentane and methylcyclohexane; aromatic hydrocarbons such as benzene, toluene and xylene; and mixtures thereof. By treating allenes and acetylenes being impurities in a conjugated diene compound, an aromatic vinyl compound and a hydrocarbon solvent used in the embodiment, singly or in the form of their mixture, with an organometal compound before the polymerization reaction, a polymer having a high concentration of active terminals can be obtained and further, a high modification ratio can be achieved.

In order to especially exhibit excellent advantages of the embodiment, by the manufacturing process according to the embodiment, a modified conjugated diene-based polymer having modifying groups (hereinafter, referred to simply as "modified conjugated diene-based polymer") is preferably manufactured so that the proportion of polymers having functional groups, that is, the modification ratio, is 5% by weight or higher, and more preferably 20% by weight or higher. The quantification method of a polymer having functional components can be measured by chromatography which can separate modifying components having functional group and non-modifying components. The chromatography is suitably a quantification method using a GPC column filled with silica to adsorb functional components and using an internal standard of non-adsorbed components for comparison.

Conjugated diene-based polymers obtainable by the manufacturing process according to the embodiment, as random copolymers, are not limited to the following, but include butadiene-isoprene random copolymers, butadiene-styrene random copolymers, isoprene-styrene random copolymers and butadiene-isoprene-styrene random copolymers. As random copolymers, there are complete random copolymers having a nearly statistically random composition, tapered random copolymers having a tapered composition distribution, and the like. Even a homopolymer having a single monomer composition can take various types of structures, including a polymer having a uniform composition of the bonding mode of the monomer, that is, of the 1,4 bonds and the 1,2 bonds, a structure having a distribution in composition and a block-like structure (having block bonds).

Block bonds include bonds of homopolymer blocks, bonds of blocks composed of random polymers and bonds of blocks composed of tapered random polymers. There are two-blocks type copolymers composed of two blocks, three-blocks type copolymers composed of three blocks, four-blocks type copolymers composed of four blocks, and the like. Examples of block polymers, if a block composed of an aromatic vinyl compound such as styrene is denoted as S and a block composed of a block of a conjugated diene compound such as butadiene or isoprene and/or a copolymer of an aromatic vinyl compound and a conjugated diene compound is denoted as B, are a S-B two-blocks type copolymer, a S-B-S three-blocks type copolymer, a S-B-S-B four-blocks type copolymer, a block copolymer represented by (S-B)m-X, and the like.

Examples of block polymers more generally include structures represented by the following general formulas:

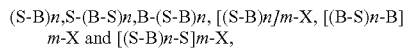

wherein the boundary between each block need not necessarily be clearly distinguished; in the case where the block B is a copolymer of an aromatic vinyl compound and a conjugated diene compound, the aromatic vinyl compound in the block B may be uniformly distributed, or may be taperedly distributed; in the block B, a part in which the aromatic vinyl compound is uniformly distributed and/or a part in which it is taperedly distributed may coexist in plural numbers, respectively; in the block B, segments different in the content of the aromatic vinyl compound may coexist in plural numbers; n is an integer of 1 or more, preferably an integer of 1 to 5; m is an integer of 2 or more, preferably an integer of 2 to 11; X denotes a residue of a coupling agent, or a residue of a polyfunctional initiator; in the case where the block S and the block B exist in plural numbers, respectively, in a copolymer, structures thereof including molecular weights and compositions may be the same or different; and the structures of polymer chains bonded with X may be the same or different. In the embodiment, optional mixtures of block polymers having the structures represented by the above-mentioned general formulas may be used.

In the embodiment, a modified conjugated diene-based polymer having modifying groups can further be hydrogenated in an inactive solvent, so that the whole of or a part of the double bond of the polymer is converted to a saturated hydrocarbon. In this case, heat resistance and weather resistance are improved the deterioration of products in processing at high temperatures can be prevented; and the mobility of molecules can be changed and the compatibility with another polymeric compound can be improved. Hence, the polymer can exhibit excellent performances in various applications such as automobile applications.

More specifically, in the embodiment, the hydrogenation ratio of the unsaturated double bond based on a conjugated diene compound can optionally be selected according to the purpose, and is not especially limited. In order to obtain a polymer excellent in heat-aging resistance and weather resistance, the hydrogenation ratio of the unsaturated double bond based on a conjugated diene compound in the polymer is higher than 70%, preferably 75% or higher, more preferably 85% or higher, and especially preferably 90% or higher. In order to improve the thermal stability, molecular mobility or the compatibility with a resin, the hydrogenation ratio in a polymer is preferably 3 to 70%, more preferably 5 to 65%, and still more preferably 10 to 60%. The hydrogenation ratio of the aromatic double bond based on an aromatic vinyl compound in a copolymer of a conjugated diene compound and the aromatic vinyl compound is not especially limited, but is 50% or lower, preferably 30% or lower, and still more preferably 20% or lower. The hydrogenation ratio can be determined by a nuclear magnetic resonance device (NMR).

As a hydrogenation process, well-known processes can be utilized. An especially suitable hydrogenation process is one in which gaseous hydrogen is injected in a polymer solution for hydrogenation in the presence of catalyst. Catalysts include, as heterogeneous catalysts, a catalyst in which a noble metal is carried on a porous inorganic substance, and as homogeneous catalysts, a catalyst in which a salt of nickel, cobalt or the like is solubilized and reacted with an organoaluminum compound or the like, and a catalyst using a metallocene such as titanocene. Above all, especially a titanocene catalyst is suitable, which can select a mild hydrogenation condition. The hydrogenation of an aromatic group can be performed using a noble metal-carrying catalyst.

Specific examples of hydrogenation catalysts are not limited to the following, but include:

(1) A carried-type heterogeneous hydrogenation catalyst in which a metal such as Ni, Pt, Pd or Ru is carried on carbon, silica, alumina, diatomaceous earth, or the like;

(2) A so-called Ziegler-type hydrogenation catalyst using a transition metal salt such as an organic acid salt or an acetylacetone salt of Ni, Co, Fe, Cr or the like, and a reducing agent such as an organoaluminum compound; and (3) A so-called organometal complex such as organometal compounds of Ti, Ru, Rh, Zr and the like. As hydrogenation catalysts, for example, usable are those described in Japanese Patent Publication Nos. S42-8704, S43-6636, S63-4841, H01-37970, H01-53851 and H02-9041, and Japanese Patent Laid-Open No. H08-109219. A preferable hydrogenation catalyst is a reaction mixture of a titanocene compound and a reducing organometal compound.

In the manufacturing process according to the embodiment, after the above-mentioned conjugated diene compound, or the above-mentioned conjugated diene compound and the above-mentioned aromatic vinyl compound are polymerized, active terminals of the obtained polymer are reacted with 75 to 95% by mass of a glycidylamino group-containing low molecular compound having two or more tertiary amino groups and three or more glycidyl groups bonded to the amino groups in a molecule of the compound, and 25 to 5% by mass of an oligomer of a dimmer or more of the low molecular compound. Here, the contents of the low molecular compound and the oligomer composed of the low molecular compound are indicated in % by mass based on the total amount of the modifying agents.

Low molecular compounds used in the embodiment are glycidylamino group-containing low molecular compounds having two or more tertiary amino groups and three or more glycidyl groups bonded to the amino groups in their molecule, and include low molecular compounds having two or more diglycidylamino groups in their molecule, and low molecular compounds having one diglycidylamino group and one or more monoglycidylamino groups in their molecule. The low molecular compounds are preferably used which have two diglycidylamino groups in their molecule. In the embodiment, the low molecular compounds are more preferably organic compounds having a molecular weight of 1,000 or lower.

The low molecular compounds used in the embodiment and having two diglycidylamino groups in their molecule have a preferable molecular structure represented by the general formula (1).

[Formula 1]

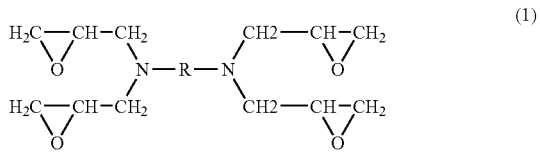

(1)

In the general formula (1), R is a divalent hydrocarbon group, or a divalent organic group having at least one polar group selected from oxygen of ether, epoxy or ketone, sulfur of thioether or thioketone, and nitrogen of a tertiary amino group or an imino group. The divalent hydrocarbon group is a saturated or unsaturated hydrocarbon which may be linear, branched or cyclic, and includes an alkylene group, an alkenylene group and a phenylene group. The specific examples are methylene, ethylene, butylene, cyclohexylene, 1,3-bis(methylene)-cyclohexane, 1,3-bis(ethylene)-cyclohexane, o-, m- or p-phenylene, m- or p-xylene and bis(phenylene)-methane.

Oligomers used in the embodiment are in the range of those of around dimer to decamer. As examples of components of oligomers used in the embodiment, a dimer of the following formula (2) and a trimer of the following formula (3) are shown.

[Formula 2]

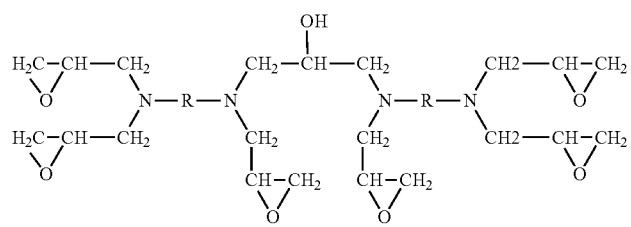

(2)

[Formula 3]

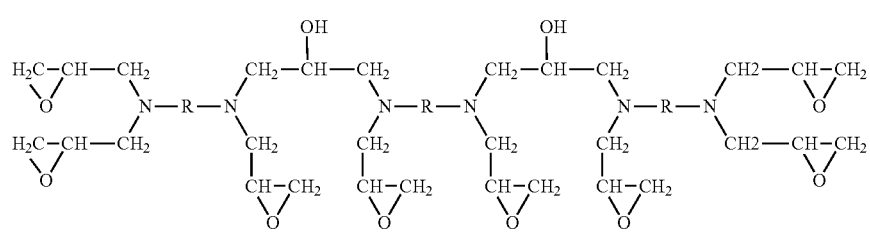

(3)

Low molecular compounds used in the embodiment preferably contain little or no active hydrogen such as a hydroxyl group, a carboxyl group and a primary or secondary amino group.

Specific examples of low molecular compounds used in the embodiment are not limited to the following, but include 1,3-bis(N,N-diglycidylaminomethyl)cyclohexane, N,N,N',N'-tetraglycidyl-m-xylenediamine, 4,4-methylene-bis(N,N-diglycidylaniline), 1,4-bis(N,N-diglycidylamino)cyclohexane, N,N,N',N'-tetraglycidyl-p-phenylenediamine, 4,4'-bis(diglycidylamino)benzophenone, 4-(4-glycidylpiperazinyl)-(N,N-diglycidyl)aniline and 2-[2-(N,N-diglycidylamino)ethyl]-1-glycidylpyrrolidine. Above all, especially preferable are 1,3-bis(N,N-diglycidylaminomethyl)cyclohexane and the like.

Modifying agents used in the embodiment as a low molecular compound include reaction products of a polyamine and epichlorohydrin, and those as an oligomer of a dimmer or more of this low molecular compound include reaction condensates of a polyamine and epichlorohydrin. The oligomers include oligomers of a dimmer or more produced as a result of the reaction of one molecule of epichlorohydrin with two molecules of an amine, and additionally oligomers of a dimmer or more produced by the reaction and bonding of epoxy groups of glycidyl groups of a low molecular compound in the presence of hydrochloric acid, and oligomers of a dimmer or more produced by these complex reactions. The oligomers are obtained also by the bonding reaction of epoxy groups by an acid or an alkali.

In the case where these oligomers are obtained by the side reaction when a glycidylamino group-containing low molecular compound is manufactured, the oligomers are produced depending on the ratios, temperature and concentrations of reactants, and storage conditions of glycidyl compounds. On the other hand, the amount of oligomers can be reduced by a method such as vacuum distillation or solvent extraction from a mixture containing oligomers.

Here, R in the above chemical formulas has the same definition as described before.

The molecular weights of the formulas (2) and (3) described above are, with the molecular weight of a low molecular compound denoted as M, nM−56(n−1) in the case of an n-mer. A modifying agent used in the embodiment is preferably reacted with active terminals of a polymer, as a mixture of a low molecular compound and oligomer components.

In the manufacturing process according to the embodiment, active terminals of a polymer are reacted with 75 to 95% by mass of a glycidylamino group-containing low molecular compound and 25 to 5% by mass of an oligomer of a dimmer or more of the low molecular compound. The ratio of a low molecular compound and an oligomer in this range can provide a vulcanized rubber excellent in the balance among wet skid characteristics, low hysteresis loss, abrasion resistance and breaking strength, and further excellent in rigidity, which are advantages of the present invention. If the oligomer components are reduced in this range, and the glycidylamino group-containing low molecular compound is set at 85 to 95% by mass and the oligomer of a dimmer or more of the low molecular compound is set at 15 to 5% by mass, a vulcanized rubber is obtained which holds the rigidity high and more excels in the balance between wet skid characteristics and low hysteresis loss; and by contrast, if the oligomer components are increased, a vulcanized rubber is obtained which moderately holds the balance between wet skid characteristics and low hysteresis loss and more excels in the rigidity. If 77% by mass or more and 93% by mass or less of the glycidylamino group-containing low molecular compound is reacted with 7% by mass or more and 23% by mass or less of the oligomer of a dimmer or more of the low molecular compound, the balance among these can exhibit more favorable effects.

The ratio of a low molecular compound and oligomer components is measured by GPC, and measured by selecting a column which can properly measure from low molecular compounds to oligomer components according to an ordinary method. The amount of the oligomer components is obtained by GPC in such a way that the cumulative amount of oligomer components is calculated from a cumulative amount from a changing point of the gradient between the peak of a low molecular compound and a peak of an oligomer component having the smallest molecular weight on the shoulder on the high molecular weight side of the low molecular compound peak to a point of an oligomer component peak of 0 on the high molecular weight side, or a cumulative amount up to a molecular weight ten times or less, as the upper limit, a molecular weight of a glycidylamino group-containing low molecular compound in terms of standard polystyrene, and expressed in percentage as a ratio of the above amount to the cumulative amount of the peak area of the low molecular compound.

In the manufacturing process according to the embodiment, the reaction ratio of active terminals of a conjugated diene-based polymer and a modifying agent is preferably such that at least 0.2 mol of the glycidyl group of the modifying agent is reacted with 1 mol of active terminals. The upper limit thereof is about 10 mol, which is an amount more of which could not exhibit an expected effect. A modified conjugated diene-based polymer obtainable in the embodiment has a proportion of polymers having modifying groups in their molecules of 20 to 80% by mass to the whole polymers. This case can provide excellent performances, which are an object of the present invention. The proportion of polymers having modifying groups in their molecules depends on the living ratio of the polymers before modification, that is, a proportion of living active terminals, and the amount of modifying agents used. The modified conjugated diene-based polymer obtainable in the embodiment has preferably a weight-average molecular weight of 200,000 to 2,000,000. This case provides a favorable balance of processability and physical properties. In the embodiment, the weight-average molecular weight is more preferably 300,000 to 2,000,000. The modified conjugated diene-based polymer obtainable in the embodiment is preferably a conjugated diene-based polymer obtainable by a continuous polymerization process, and is preferably a modified conjugated diene-based polymer having a monomodal molecular weight distribution and Mw/Mn of 1.8 to 3. The modified conjugated diene-based polymer has more preferably Mw/Mn exceeding 2.1 and lower than 3. This range provides more remarkable advantages of the present invention. That is, a vulcanized rubber can be obtained which holds the balance between wet skid characteristics and low hysteresis loss while excelling in abrasion resistance and excelling in rigidity.

In the embodiment, in a solution of a polymer, obtained by reacting a polymer with a low molecular compound having a glycidylamino group and its oligomer as modifying agents, in an inactive solvent, a reaction terminator can be added according to need. The reaction terminators to be commonly used are alcohols such as methanol, ethanol and propanol, organic acids such as stearic acid, lauric acid and octanoic acid, water, and the like.

In the embodiment, according to need, metals contained in a polymer can be deashed. Commonly, the deashing method involves contacting water, an organic acid, an inorganic acid, an oxidant such as hydrogen peroxide, or the like with a polymer solution to extract metals and then separating the water phase.

In the embodiment, in a solution of a polymer in an inactive solvent, an antioxidant can be added. The antioxidants include phenolic stabilizers, phosphorus-based stabilizers, sulfur-based stabilizers and amine-based stabilizers.

Acquiring a polymer from a polymer solution can be performed by well-known methods. Employable methods are, for example, one in which after a solvent is separated by steam stripping or the like, a polymer is filtered out, further dewatered and dried to acquire the polymer, one in which a polymer is concentrated in a flashing tank, and devolatilized by a vent extruder or the like, and one in which a polymer is directly devolatilized by a drum drier or the like.

One of preferred embodiments of the present invention is the case where the conjugated diene-based polymer is a random copolymer. Using as monomers a combination of one or two or more conjugated diene compounds and styrene, a living random copolymer of the conjugated diene compounds and styrene is obtained in an active solvent using an organic monolithium compound as an initiator. The polymer has a glass transition temperature in the range of $-100°$ C. to $0°$ C., and a ratio of 1,4-bonds to 1,2-bonds or 3,4-bonds in the conjugated diene parts of 10% to 90% against 90% to 10%. The bonded styrene amount in the copolymer is 1 to 50% by mass. The chain distribution of styrene in the copolymer is preferably random. This case can provide a rubber excellent for tire treads. The random copolymer preferably has few styrene chain structures, and an amount of insoluble styrene components in osmic acid decomposition products by Korthoff method is preferably 3% by mass or lower per polymer. Further, a complete random structure is more preferable. That is, the isolated styrene (a single styrene molecule) is 40% by mass or more to the whole bonded styrene; and the styrene chain (chain of 8 styrene molecules) is 5% by mass or lower, and preferably 2.5% by mass or lower.

The viscosity of the modified conjugated diene-based polymer obtainable by the manufacturing process according to the embodiment is controlled depending on applications and purposes. Commonly, Mooney viscosity ($100°$ C. 1+4 min) of a raw material rubber for a vulcanized rubber is controlled at 20 to 100. In the case where a raw material rubber has a high Mooney viscosity, it is commonly extended by an extension oil so that the viscosity is turned into this range in consideration of easiness of a finishing process in manufacture and in order to improve processability in kneading, improve dispersibility of fillers and improve various physical properties due to the dispersibility. As extension oils, preferably used are aroma oils, naphthenic oils, paraffin oils, and polycyclic aromatic components being DMSO extraction components by the method of IP 346, that is, aroma-alternative oils of PCA of 3% by mass or less. The aroma-alternative oils include Treated Distillate Aromatic Extract (T-DAE) and Mild Extraction Solvate (MES) shown in Kautschuk Gummi Kunstoffe, 52(12), 799(1999), and additionally Safety Residual Aromatic Extract (S-RAE) made by Japan Energy Corp. Here, if an oil-extended modified conjugated diene-based polymer is made which contains 5 to 60 parts by mass of polycyclic aromatic components by the IP 346 method, that is, an extension oil of PCA of 3% by mass or less, in 100 parts by mass of the modified conjugated diene-based polymer according to the present invention, it can provide a vulcanized rubber having characteristically excellent performances of the present invention and excelling in environmental countermeasures. The use amount of an extension oil is optional, but commonly 5 to 60 parts by weight, and preferably 20 to 37.5 parts by weight to 100 parts by weight of a polymer.

If a filler selected from the group consisting of silica-based inorganic fillers, metal oxides and metal hydroxides is dispersed in a modified conjugated diene-based polymer obtainable by the manufacturing process according to the embodiment, fine dispersion is obtained, thus providing an excellent effect on performances. In the case where the polymer is used for vulcanized rubber applications to automobile parts such as tires and vibration damping rubbers, shoes and the like, silica-based inorganic filler is suitably used as a reinforcing agent, and a synthetic silicic acid having a primary particle diameter of 50 nm or less is especially suitable. The synthetic silicic acid preferably used is wet silica and dry silica. The wet silica is referred to also as synthetic hydrated silicic acid. In this case, the filler is quickly, homogeneously and microparticulately and reproducingly dispersed by a short-time kneading, providing remarkably favorable physical properties. Additionally, synthetic silicates are also used.

A reinforcing agent usable is carbon black. Carbon black is not especially limited, but usable are furnace black, acetylene black, thermal black, channel black, graphite and the like. Above all, furnace black is especially preferable.

The modified conjugated diene-based polymer obtainable by the manufacturing process according to the embodiment is preferably used as a raw material rubber for vulcanized rubber compositions. In this case, a vulcanized rubber composition is preferably used in which 100 parts by weight of a raw material rubber is blended with 1 to 200 parts by weight of silica-based inorganic filler and 1 to 100 parts by weight of carbon black, singly or concurrently. In this case, as advantages of the present invention, especially the dispersibility of silica is good and stable and performances of the vulcanized rubber are excellent. Specifically, the silica-based inorganic filler and the carbon black are homogeneously dispersed, and a vulcanized rubber can be obtained whose storage modulus is in little dependence on strain. In applications to tire treads, the polymer can achieve, more than conventionally, improvement in the balance of low rolling resistance and wet skid resistance, improvement in abrasion resistance, further, improvement in strength, improvement in rigidity, and the like, and can make compositions suitable also for rubbers for tires, vibration damping rubbers, and footwear. Particularly, tires using the modified conjugated diene-based polymer obtainable by the manufacturing process according to the embodiment and containing silica-based inorganic filler and/or a carbon black can provide suitable performances.

The modified conjugated diene-based polymer obtainable by the manufacturing process according to the embodiment is used, as a raw material rubber, singly or as a mixture with other rubbers as needed. In the case where the polymer is used as a mixture with other rubbers, an excessively low proportion of the modified conjugated diene-based polymer of the embodiment is not preferable because the advantage of the modification of the present invention cannot fully be exhibited. The other rubbers include, for example, natural rubber, polyisoprene rubber, emulsion polymerization styrene-butadiene copolymerized rubber, solution polymerization random SBR (bonded styrene: 5 to 50% by weight, and 1,2-vinyl bond amount of butadiene bonding unit parts: 10 to 80%), high trans-SBR (1,4-trans-bond amount of butadiene bonding unit parts: 70 to 95%), low cis-polybutadiene rubber, high cis-polybutadiene rubber, high trans-polybutadiene rubber (1,4-trans-bond amount of butadiene bonding unit parts: 70 to 95%), styrene-isoprene copolymerized rubber, butadiene-isoprene copolymerized rubber, solution polymerization random styrene-butadiene-isoprene copolymerized rubber, emulsion polymerization random styrene-butadiene-isoprene copolymerized rubber, emulsion polymerization styrene-acrylonitrile-butadiene copolymerized rubber, acrylonitrile-butadiene copolymerized rubber, and block copolymers such as high vinyl SBR-low vinyl SBR block copolymerized rubber and polystyrene-polybutadiene-polystyrene block copolymers. These can suitably be selected according to required characteristics.

The proportions of respective components in the case where the modified conjugated diene-based polymer of the embodiment and the other rubbers are used as raw material rubber components are, in weight ratio, commonly in the range of 10 to 99:90 to 1, preferably 20 to 90:80 to 10, and more preferably 30 to 80:70 to 20. As rubber formulating agents, for example, reinforcing agents, vulcanizing agents, vulcanization accelerators, vulcanization aids, oils and the like can be further used.

The vulcanizing agents are not especially limited, but include sulfur such as powdery sulfur, precipitated sulfur, colloidal sulfur, insoluble sulfur and highly dispersible sulfur; halogenated sulfur such as sulfur monochloride and sulfur dichloride; and organic peroxides such as dicumyl peroxide and di-tertiary butyl peroxide. Above all, sulfur is preferable and sulfur powder is especially preferable. The formulation proportion of a vulcanizing agent is commonly 0.1 to 15 parts by weight, preferably 0.3 to 10 parts by weight, and still more preferably 0.5 to 5 parts by weight to 100 parts by weight of the rubber components.

The vulcanization accelerators include sulfonamide, thiourea-, thiazole-, dithiocarbamic acid- and xanthogenic acid vulcanization accelerators. The formulation proportion of a vulcanization accelerator is commonly in the range of 0.1 to 15 parts by weight, preferably 0.3 to 10 parts by weight, and more preferably 0.5 to 5 parts by weight to 100 parts by weight of the rubber components.

The vulcanization aids are not especially limited, but for example, stearic acid, zinc oxide and the like can be used.

As the oils used as formulating agents, for example, aroma, naphthenic, paraffinic, silicone or other extension oils are selected according to applications. The use amount of an oil is commonly in the range of 1 to 150 parts by weight, preferably 2 to 100 parts by weight, and more preferably 3 to 60 parts by weight to 100 parts by weight of the rubber components. When the use amount of an oil is in this range, dispersion effect, tensile strength, abrasion resistance, heat resistance and the like of a reinforcing agent are balanced in high levels.

Compositions using the modified conjugated diene-based polymer obtainable by the manufacturing process according to the embodiment as a rubber component can contain, other than the above-mentioned components, and according to a common process, other formulating agents including fillers such as calcium carbonate, clay, talc, mica, aluminum hydroxide and magnesium hydroxide; amine-based or phenolic antioxidants; antiozonants; silane coupling agents; activators such as diethylene glycol; processing aids; tackifiers; and waxes, in respective necessary amounts.

Compositions using the modified conjugated diene-based polymer obtainable by the manufacturing process according to the embodiment as a rubber component are manufactured by mixing the above-mentioned components using well-known kneading machines for rubbers, for example, rolls and a Banbury mixer.

The modified conjugated diene-based polymer according to the embodiment is one obtainable by the above-mentioned manufacturing process of a modified conjugated diene-based polymer. Then, since the polymer according to the embodiment has such a constitution, is has the above-mentioned excellent effects.

EXAMPLES

Hereinafter, the present invention will be described specifically by way of Examples. However, the scope of the present invention is not limited anymore to these. Analyses of samples in Examples were conducted by methods described below.

(1) Bonded Styrene Amount

A sample was made into a chloroform solution, and measured for the bonded styrene amount (% by weight) by the absorption of UV of 254 nm by a phenyl group of styrene (UV-2450, made by Shimadzu Corp.).

(2) Styrene Chain

The styrene chain was determined by a method in which insoluble polystyrene corresponding to block polystyrene was deposited from an osmic acid decomposition product by Korthoff method in methanol; the insoluble styrene amount was quantitatively determined; and the block styrene amount was indicated in % by mass per polymer.

The contents of a styrene single-chain containing one styrene unit and a styrene long-chain containing 8 or more styrene units were analyzed by gel permeation chromatography (GPC) after a styrene-butadiene copolymerized rubber was decomposed with ozone according to a method by Tanaka, et al. (Polymer, 22, 1721(1981)).

(3) Microstructure of Butadiene Parts

A sample was made into a carbon disulfide solution; an infrared spectrum of the solution was measured in the range of 600 to 1,000 $cm^{-1}$ using a solution cell, and a microstructure of butadiene parts was determined from a predetermined absorbance using a calculating formula of Hampton method (FT/IR-4100, made by JASCO Corp.).

(4) Mooney Viscosity

The viscosity was measured at 100° C. at 4 min after preheating for 1 min using an L-type rotor according to JIS K6300-1.

(5) Molecular Weight and Molecular Weight Distribution

Chromatogram was measured using GPC using three linked columns filled with a polystyrene gel, and the molecular weight and the molecular weight distribution were calculated using a calibration curve using the standard polystyrene. The eluent used was tetrahydrofuran (TI-IF). The measurement was conducted by using apparatuses and under conditions: guard column: Tosoh TSK guardcolumn HHR-H, columns: Tosoh TSKgel G6000HHR, TSKgel G50001HHR and TSKgel G4000HHR, oven temperature: 40° C., THF flow rate: 1.0 ml/min, and measuring apparatus: HLC-8020, made by Tosoh Corp. and detector: IR. The measurement was conducted by injecting 200 μl of each of samples in which 10 mg and 20 mg of samples having a narrow and a broad molecular weight distribution, respectively, were dissolved in 20 ml of THF.

(6) Modification Ratio

The modification ratio was determined in such a way that, applying a property that modified components are adsorbed in GPC column filled with a silica-based gel, there are measured both chromatograms by GPC (MX-8020, made by Tosoh Corp.) using the above (5)-mentioned polystyrene gel (Tosoh TSK) and by GPC (made by Tosoh Corp., CCP8020 series, buildup-type GPC system: AS-8020, SD-8022, CCPS, CO-8020, RI-8021) using silica-based columns (guard column: DIOL 4.6×12.5 mm 5 micron, columns: Zorbax PSM-1000S, PSM-300S, PSM60S, oven temperature: 40° C., THF flow rate: 0.5 ml/min), using a sample solution containing a sample and a low molecular weight internal standard polystyrene of 5,000 in molecular weight (polystyrene is not adsorbed); and the adsorption amount to the silica column was measured from their differences based on the internal standard polystyrene peak to determine a modification ratio. The measurement was conducted by injecting 200 μl of each of samples in which 10 mg, and 20 mg of samples having a narrow and a broad molecular weight distribution, respectively, were dissolved with 5 mg of the standard polystyrene in 20 ml of THF for each of both the chromatograms. The specific procedure involves: setting the whole of the peak area of a chromatogram using the polystyrene columns at 100, denoting the sample peak area as P1, denoting the peak area of the standard polystyrene as P2; setting the whole of the peak area of a chromatogram using the silica-based columns at 100, denoting the sample peak area as P3 and denoting the peak area of the standard polystyrene as P4; and determining a modification ratio (%) by $[1-(P2\times P3)/(P1\times P4)]\times 100$.

(7) Quantitative Determination of a Low Molecular Compound and an Oligomer as Modifying Agents GPC measurement was conducted using, as GPC columns, TSKgel G3000HXL, TSKgel G2000HXL and TSKgel G1000HXL, using THF as an eluent, using GPC apparatus, HLC-8220, made by Tosoh Corp., and RI as a detector, and under conditions of an oven temperature of 40° C. and an eluent flow rate of 1.0 ml/min, and injecting 200 μl of a THF solution of 1.0 mg/ml of a sample. The molecular weight was calibrated by the standard polystyrene.

(8) Structure Identification of Oligomer Components

The structure identification was conducted using a mass spectrum.

A sample was dissolved in THF, and completely mixed with a matrix (dithranol), and thereafter, dropped on a sample plate; after the solvent was evaporated, MALDI-TOF/MS measurement was conducted.

Measuring Conditions

Apparatus: AXIMA CFR plus, made by Shimazdu Corp.
Laser: nitrogen laser (337 nm)
Detector type: linear mode
Ion detection: positive ion (positive mode)
Cumulative frequency: 500 times
Matrix: dithranol 10 mg/mL THF solution
Sample: 1 mg/mL THF solution
Scan range: m/ML to 2000

Example 1

A Manufacturing Process of a Modified Conjugated Diene-Based Polymer

Two autoclaves as reactors were connected in series which each had an internal volume of 10 L, an inlet at the bottom, an outlet at the head, and a stirrer and a jacket attached. Butadiene, styrene and cyclohexane were mixed at 20.1 g/min, 9.9 g/min and 120 g/min, respectively. The mixed solution was passed through a dehydrated column filled with an active alumina, mixed with n-butyllithium at 0.004 g/min in a static mixer in order to remove impurities, and thereafter, continuously supplied to the bottom of the first reactor; and further 2,2-bis(2-oxolanyl)propane as a polar substance and n-butyllithium as a polymerization initiator were continuously supplied to the bottom of the first reactor at 0.0216 g/min and 0.011 g/min, respectively, and the temperature of the interior of the reactor was held at 95° C. A polymer solution was continuously extracted from the head of the reactor, and supplied to the second reactor. The temperature of the second reactor was held at 95° C.; a mixture of 89.9% by mass of tetraglycidyl-1,3-bisaminomethylcyclohexane (monomer) and 10.1% by mass of oligomer components as modifying agents (hereinafter, referred to as "modifying agent A") was continuously at a rate of 0.009 g/min added to the second reactor as a solution diluted 1,000 times with cyclohexane to perform a modification reaction. The polymer solution was continuously extracted from the reactor, continuously added with an antioxidant by a static mixer, further added and mixed with 37.5 parts by mass of an extension oil NC140, made by Japan Energy Corp., based on 100 parts by mass of the polymer; and thereafter, the solvent was removed to obtain a target oil-extended modified diene polymer. The polymer was denoted as a sample PA. Here, GPC of the modifying agent A used is shown in FIG. 1. The calibration curve by the standard polystyrene of GPC is shown in FIG. 3. The mass spectrum of the modifying agent A is shown in FIG. 4. Main components of the oligomer components of the modifying agent A were ones represented by the above-mentioned formulas (2) and (3), and R was 1,3-bis(methylene)-cyclohexane.

The extension oil NC140, made by Japan Energy Corp., is polycyclic aromatic components by the method of IP 346, that is, an aroma-alternative oil of PCA of 3% by mass or less.

The polymer sample PA had a bonded styrene amount of 33% by mass, a bonded butadiene amount of 67% by mass; the microstructure of the butadiene parts had a 1,2-vinyl bond amount of 34 mol %, 1,4-cis-bond amount of 27 mol % and 1,4-trans-bond amount of 39 mol %; based on the styrene chain, the block styrene by Korthoff method was 0% by mass, the styrene single chain by the ozone decomposition was 47% by mass, and the content of the styrene long-chain containing 8 or more linked styrene units was 1% by mass. The molecular weight distribution by GPC was monomodal; the weight-average molecular weight (Mw) was 800,000 in terms of polystyrene; and the molecular weight distribution (Mw/MN) was 2.5. The modification ratio measured using adsorptive silica-based columns was 48% by mass. The Mooney viscosity of the oil-extended polymer was ML1+4 (100° C.) 67.

Example 2

A polymer sample PB was obtained as in Example 1, except for using a mixture (hereinafter, referred to as "modifying agent B") of 81.7% by mass of tetraglycidyl-1,3-bisaminomethylcyclohexane (monomer) and 18.3% by mass of oligomer components as modifying agents. The modifying agent B used was a product commercially available as an epoxy resin raw material. GPC thereof is shown in FIG. 2. The calibration curve by the standard polystyrene of GPC is shown in FIG. 3. The mass spectrum of the modifying agent B is shown in FIG. 5. Main components of the oligomer components were ones represented by the above-mentioned formulas (2) and (3), and R was 1,3-bis(methylene)-cyclohexane.

The polymer sample PB had a bonded styrene amount of 33% by mass, a bonded butadiene amount of 67% by mass; the microstructure of the butadiene parts had a 1,2-vinyl bond amount of 34 mol %, 1,4-cis-bond amount of 27 mol % and 1,4-trans-bond amount of 39 mol %; based on the styrene chain, the block styrene amount by Korthoff method was 0% by mass, the styrene single chain by the ozone decomposition was 47% by mass, and the content of the styrene long-chain containing 8 or more linked styrene units was 1% by mass. The molecular weight distribution by GPC was monomodal; the weight-average molecular weight (Mw) was 800,000 in terms of polystyrene; and the molecular weight distribution (Mw/MN) was 2.6. The modification ratio measured using adsorptive silica-based columns was 46% by mass. The Mooney viscosity of the oil-extended polymer was ML1+4 (100° C.) 65.

Comparative Example 1

A polymer sample PC was obtained as in Example 1, except for using a mixture (hereinafter, referred to as "modifying agent C") of 96.0% by mass of tetraglycidyl-1,3-bisaminomethylcyclohexane (monomer) and 4.0% by mass of oligomer components as modifying agents. Here, the modifying agent C was obtained by removing the hardly soluble oligomer components from the modifying agent A by reprecipitation using a cyclohexane solvent.

The polymer sample PC had a bonded styrene amount of 33% by mass, a bonded butadiene amount of 67% by mass; the microstructure of the butadiene parts had a 1,2-vinyl bond amount of 34 mol %, 1,4-cis-bond amount of 27 mol % and 1,4-trans-bond amount of 39 mol %; based on the styrene chain, the block styrene amount by Korthoff method was 0% by mass, the styrene single chain by the ozone decomposition was 47% by mass, and the content of the styrene long-chain containing 8 or more linked styrene units was 1% by mass. The molecular weight distribution by GPC was monomodal; the weight-average molecular weight (Mw) was 810,000 in terms of polystyrene; and the molecular weight distribution (Mw/MN) was 2.4. The modification ratio measured using adsorptive silica-based columns was 48% by mass. The Mooney viscosity of the oil-extended polymer was ML1+4 (100° C.) 67.

Comparative Example 2

A polymer sample PD was obtained as in Example 1, except for using a mixture (hereinafter, referred to as "modifying agent D") of 71.5% by mass of tetraglycidyl-1,3-bisaminomethylcyclohexane (monomer) and 28.5% by mass of oligomer components as modifying agents. Here, the modifying agent D was obtained by adding 0.8 parts by mass of n-butyllithium based on 100 parts by mass of the modifying agent B to a cyclohexane 1-mass % solution of the modifying agent B and reacting the mixture at room temperature, and the reaction product was used at 30 min after the reaction.

The polymer sample PD had a bonded styrene amount of 33% by mass, a bonded butadiene amount of 67% by mass; the microstructure of the butadiene parts had a 1,2-vinyl bond amount of 34 mol %, 1,4-cis-bond amount of 27 mol % and 1,4-trans-bond amount of 39 mol %; based on the styrene chain, the block styrene amount by Korthoff method was 0% by mass, the styrene single chain by the ozone decomposition was 47% by mass, and the content of the styrene long-chain containing 8 or more linked styrene units was 1% by mass. The molecular weight distribution by GPC was monomodal; the weight-average molecular weight (Mw) was 800,000 in terms of polystyrene; and the molecular weight distribution (Mw/MN) was 2.7. The modification ratio measured using adsorptive silica-based columns was 40% by mass. The Mooney viscosity of the oil-extended polymer was ML1+4 (100° C.) 61.

Samples shown in Table 1 (sample PA to sample PD):

Using the copolymers as raw material rubbers, rubber compositions were obtained according to the formulation shown in Table 2.

TABLE 1

Evaluation results

| | | Ex./Com. Ex. | | | |
|---|---|---|---|---|---|
| | | Ex. 1 | Ex. 2 | Com. Ex. 1 | Com. Ex. 2 |
| Polymer Sample | | PA | PB | PC | PD |
| Bound Rubber | mass % | 45 | 44 | 38 | 36 |
| Formulated Material Mooney | Viscosity | 72 | 76 | 61 | 60 |
| Hardness | type A | 63 | 63 | 63 | 60 |
| Tensile Test | | | | | |
| 100% Mo | MPa | 2.1 | 2.1 | 2 | 1.9 |
| 300% Mo | MPa | 10.1 | 10.5 | 9.2 | 8.9 |
| Breaking Strength | MPa | 20 | 20.5 | 19.4 | 17.6 |
| Breaking Elongation | % | 510 | 500 | 535 | 470 |
| Rupke Impact Resilience 0° C. | % | 10.5 | 9.5 | 11.9 | 9.5 |
| Rupke Impact Resilience 50° C. | % | 58 | 57.5 | 57 | 56.5 |
| Goodrich Heat Generation ΔT | °C. | 25 | 26 | 27 | 28 |
| Viscoelasticity ARES | | | | | |
| tan δ (0° C.) | 1% strain | 0.41 | 0.415 | 0.388 | 0.395 |
| tan δ (50° C.) | 3% strain | 0.187 | 0.188 | 0.188 | 0.19 |
| ΔG' (50° C.) | 0.1%-10% | 3.17 | 3.3 | 3.06 | 3.55 |
| G' (50° C.) | 3% strain | 3.85 | 3.92 | 3.62 | 3.71 |
| Acron Abrasion | Index | 105 | 108 | 100 | 97 |

TABLE 2

Formulation for evaluation

| | |
|---|---|
| Oil-extended Polymer Sample | 137.5 parts |
| Silica Ultrasil VN3 | 63 parts |
| Seast KH | 7.00 parts |
| Si75 | 5.04 parts |
| Zinc Oxide | 2.50 parts |
| Stearic Acid | 1.00 parts |
| Sunnoc N (Wax) | 1.50 parts |
| Antioxidant 810NA | 2.00 parts |
| Sulfur | 1.70 parts |
| Vucanization Accelerator CZ | 1.70 parts |
| Vucanization Accelerator D | 2.00 parts |

Kneading was performed by the following method.

As a first stage kneading, a raw material rubber, fillers (silica and carbon black), an organic silane coupling agent, an oil, zinc oxide and stearic acid were kneaded using a closed kneading machine (internal volume: 0.3 L) provided with an attached temperature control device with the filling ratio of 65% and under the condition of rotor frequencies of 50/57 rpm. At this time, the temperature of the closed kneading machine was controlled, and a rubber composition was obtained at the discharging temperature (formulated material) of 155 to 165° C.

Then, as a second stage kneading, the formulated material obtained in the above was cooled to room temperature, thereafter, added with an antioxidant, and again kneaded in order to improve the dispersion of silica. Also in this case, the discharging temperature (formulated material) was controlled at 155 to 160° C. by the temperature control of the kneading machine.

After the cooling, as a third stage kneading, sulfur and a vulcanization accelerator were kneaded by open rolls set at 70° C.

The kneaded material was molded, and vulcanized at 160° C. for a predetermined time on a vulcanizing press, and measured for physical properties. Measurement results of the physical properties are shown in Table 1.

The measurement method of each physical property was as follows.

(1) Bound Rubber

About 0.2 g of the formulated material after the second stage kneading was cut into pieces of about 1-mm square, put in a Harris cage (100-mesh metal screen) and measured for the weight. Thereafter, the pieces were immersed in toluene for 24 hours, dried, and measured for the weight; and taking undissolved components into account, the amount of the rubber bonded to the fillers was calculated, and the proportion of the rubber bonded to the fillers was determined based on the rubber amount in the first formulated material.

(2) Mooney Viscosity of Formulated Materials

The viscosity at 130° C. at 4 min after preheating for 1 min was measured using an L type rotor according to JIS K6300-1.

(3) Hardness

The hardness was measured by a durometer of type A according to JIS K6253.

(4) Tensile Test

The tensile strength and the elongation at breaking of a test sample, and the tensile stress at 100% elongation (100% Mo) and the tensile stress at 300% elongation (300% Mo) thereof were measured using the test sample of dumbbell shape No. 3 according to the tensile testing method of JIS K6251.

(5) Measurement of Viscoelastic Characteristics

Tan δ and the elastic modulus (G') were measured using an ARES viscoelasticity tester, made by Rheometrics Scientific Inc., and varying the strain at a frequency of 10 Hz and at each measurement temperature (0° C. and 50° C.) by the tortional mode.

The Payne effect (ΔG') was denoted by a difference in G' between a maximum value and a minimum value in strains of 0.1% to 10%. A smaller Payne effect has a better dispersibility of a filler such as silica.

A higher Tan δ at a low temperature (0° C.) exhibits a more excellent wet skid (gripping) performance; and a lower Tan δ at a high temperature (50° C.) exhibits a smaller hysteresis loss, and a lower rolling resistance of tires, that is, a lower fuel consumption.

The elastic modulus (G') at a high temperature (50° C.) and at a strain of 3% was defined as an index for the rigidity.

(6) Measurement of Impact Resilience

The impact resilience was measured at 0° C. and at 50° C. by Rupke type impact resilience testing method according to JIS K6255.

(7) Heat Generation

The heat generation was tested using a Goodrich Flexometer, at a frequency of 1,800 rpm, at stroke of 0.225 inch, on a load of 55 pounds, with a measurement starting temperature of 50° C., and indicated by a difference between a temperature at 20 min after starting of the test and the starting temperature.

(8) Acron Abrasion Amount

With respect to the abrasion resistance, the abrasion amount was measured using an Acron abrasion tester, after 3,000 rotations on a load of 6 pounds. A higher index indicates a smaller abrasion amount, which is favorable.

As shown in Example 1 and Example 2 in Table 1, in the modified conjugated diene-based polymer manufactured according to the embodiment, the bound rubber amount of the silica-formulated composition increased; the Payne effect (50° C. ΔG') was low and the dispersibility of the silica was excellent; Tan δ at the high temperature was low and the hysteresis loss was little; and the rolling resistance of tires was low, that is, the fuel consumption was excellently low. The balance of the low fuel consumption and the wet skid (gripping) performance (Tan δ at the low temperature) was excellent. Further, the abrasion resistance was good, and additionally, the storage elastic modulus at the high temperature was high and the rigidity was excellent.

The embodiment has been described in detail with reference to a specific embodiment, but it is obvious by those skilled in the art that various changes and modifications may be made without departing from the spirit and the scope of the present invention.

The present application is based on Japanese Patent application No. 2007-084310, filed to Japan Patent Office on Mar. 28, 2007, the subject of which is hereby incorporated herein by reference.

INDUSTRIAL APPLICABILITY

The modified conjugated diene-based polymer manufactured by the manufacturing process according to the present invention, by using it for a formulation containing various types of fillers including reinforcing silica, provides a vulcanized rubber composition for tire treads excellent in strength characteristics, fuel consumption saving performance, gripping performance, abrasion resistance and rigidity. The polymer also has the industrial applicability to, other than tires, footwear applications, various parts of automobiles, industrial goods, and the like.

The invention claimed is:

1. A process for manufacturing a modified conjugated diene-based polymer having a modifying group in a molecule thereof, the process comprising:
   a step of obtaining a conjugated diene-based polymer by polymerizing a conjugated diene compound, or a conjugated diene compound and an aromatic vinyl compound, by using an alkaline metal-based initiator or an alkaline earth metal-based initiator in a hydrocarbon solvent; and
   a step of reacting active terminals of the polymer with a glycidylamino group-containing organic compound having a molecular weight of 1,000 or lower and having two or more tertiary amino groups and three or more glycidyl groups bonded to the amino groups in a molecule of the compound, and an oligomer of a dimer or more of the organic compound as modifying agents, wherein the reaction is performed using 75 to 95% by mass of the organic compound and 25 to 5% by mass of the oligomer based on the total amount of the modifying agents.

2. The process for manufacturing the modified conjugated diene-based polymer according to claim 1, wherein the organic compound used in the reaction has two diglycidylamino groups in a molecule thereof.

3. The process for manufacturing the modified conjugated diene-based polymer according to claim 1, wherein the conjugated diene-based polymer is a random copolymer of at least one conjugated diene compound and at least one aromatic vinyl compound.

4. A modified conjugated diene-based polymer obtained by the manufacturing process according to claim 1.

5. An oil-extended modified conjugated diene-based polymer composition, comprising 100 parts by mass of the modified conjugated diene-based polymer according to claim 4 and 5 to 60 parts by mass of an extension oil containing 3% by mass or less of polycyclic aromatic components by the IP 346 method.

6. A modified conjugated diene-based polymer composition, comprising 100 parts by mass of the modified conjugated diene-based polymer according to claim 4 and 1 to 200 parts by mass of silica-based inorganic filler.

7. A modified conjugated diene-based polymer composition, comprising 100 parts by mass of the modified conjugated diene-based polymer according to claim 4 and 1 to 100 parts by mass of a carbon black.

8. A tire comprising the composition according to claim 6.

9. A tire comprising the composition according to claim 7.

10. A modified conjugated diene-based polymer obtained by the manufacturing process according to claim 2.

11. A modified conjugated diene-based polymer obtained by the manufacturing process according to claim 3.

* * * * *